United States Patent [19]

Bruesselbach

[11] Patent Number: 4,734,911
[45] Date of Patent: Mar. 29, 1988

[54] EFFICIENT PHASE CONJUGATE LASER

[75] Inventor: Hans W. Bruesselbach, Calabasas, Calif.

[73] Assignee: Hughes Aircraft Company, Los Angeles, Calif.

[21] Appl. No.: 839,475

[22] Filed: Mar. 14, 1986

[51] Int. Cl.$^4$ .............................. H01S 3/10; H01S 3/8; H01S 3/13

[52] U.S. Cl. ....................... 372/21; 372/29; 372/32; 372/33; 372/99; 372/9

[58] Field of Search ............... 372/3, 9, 18, 20, 21, 372/23, 29, 31, 32, 33, 97, 99

[56] References Cited

U.S. PATENT DOCUMENTS

| | | | |
|---|---|---|---|
| 4,068,190 | 1/1978 | Ferguson | 372/33 |
| 4,220,928 | 9/1980 | Bloom et al. | 372/33 |
| 4,233,571 | 11/1980 | Wang et al. | 372/99 |
| 4,321,550 | 3/1982 | Evtuhov | 372/9 |
| 4,390,991 | 6/1983 | Pearson | 372/21 |
| 4,500,855 | 2/1985 | Feinberg | 372/21 |
| 4,573,157 | 2/1986 | O'Meara | 372/20 |

FOREIGN PATENT DOCUMENTS 2004411 3/1979 United Kingdom.

OTHER PUBLICATIONS

Gower et al., "KrF laser with a Phase-Conjugates Brillouin Mirror", Optics Letters vol. 7 No. 4 Apr. 1982 p. 162.
Uriss et al., "Stabilized Injection Locking Light Amplification of a 1.15 um He-Ne Laser" J. Appl. Phys. vol. 59 (5) May 1981 pp. 3154-3158.
Bagaev et al., "Reproducibility of the Frequency of an He-Ne Laser with a Methane Absorbing Cell", JETP Lett. vol. 20 No. 5, Sep. 5, 1974 pp. 130-132.
Chandra et al., "Sidearm Stimulated Scatterings Phase-Conjugated Laser Resonator" Optics Letters vol. 10 No. 7 Jul. 1985 pp. 356-358.
Wang et al. "Correction of Phase Aberrations via Stimulated Brillouin Scattering" Optics Letters vol. 2, No. 1 Jan. 1978 pp. 4-6.
V. V. Shkunov and B. Y. Zel'dovich, "Optical Phase Conjugation", Scientific American 253 #6, 54 (Dec. 1985).

(List continued on next page.)

Primary Examiner—Eugene R. Laroche
Assistant Examiner—Michael B. Shingleton
Attorney, Agent, or Firm—Kenneth W. Float; A. W. Karambelas

[57] ABSTRACT

A laser apparatus (10) utilizing a master oscillator power amplifier configuration wherein a master oscillator (12) provides a source of low energy, high phase front quality, and high spectral purity radiation, injected into at least one lasing medium gain element (14) disposed along an optical path. Coupling means (16) is positioned to selectively couple a predetermined percentage of the master oscillator (12) radiation into the gain element (14) medium while preventing all but a predetermined percentage of any amplified radiation exiting the gain element (14) from re-entering the master oscillator (12). Phase conjugation means (20) is disposed along the optical path on the opposite side of the gain element (14) as the coupling means (16), for reflecting the phase conjugate of laser radiation incident thereon. Delay means (26) positioned between the gain element (14) and the phase conjugation means (16) assures that radiation pulses coupled along the optical path traverse and substantially exit from the gain element (14), toward the phase conjugation means (20), before any reflected radiation from the phase conjugation means (20) enters the gain element (14). In a further aspect of the invention the laser apparatus (100) further comprises imaging means (132) disposed along the optical path between said phase conjugation means (120) and said gain element (114) so as to provide maximum transfer of phase information from the lasing medium of said gain element (114) to said phase conjugate reflector (120) and back.

23 Claims, 3 Drawing Figures

OTHER PUBLICATIONS

O. Y. Nosach, et al., "Cancellation of Phase Distortions in an Amplifying Medium with a Brillouin Mirror", ZhETF PIS. RED., vol. 16, No. 11, pp. 617-621 (Dec. 5, 1972).

B. Y. Zel'dovich, et al., "Connection Between the Wave Fronts of the Reflected and Exciting Light in Stimulated Mandel'Shtam-Brillouin Scattering", ZhEFT PIS. RED., vol. 15, No. 3, pp. 160-164 (Feb. 5, 1972).

"KrF Laser Amplifier with Phase-Conjugate Brillouin Retroreflectors" by M. C. Gower, Optics Letters, vol. 7, 1982, pp. 423-425.

"High-power Ruby Laser with a Stimulated Brillouin Scattering Mirror for Generation of a High-Temperature Plasma", by V. A. Boiko et al.; Sov. J. Quant. Elect., vol. 12, 1982, pp. 970-972.

"Single-mode Pulse-Periodic Oscillator-Amplifier System with Wavefront Reversal", by I. G. Zubarev et al., vol. 10, 1980, pp. 1179-1181.

"Multiple use of Wavefront Reversal in Laser Systems", by E. N. Ragozin et al; Sov. J. Quant. Elect., vol. 10, 1980, pp. 915-916.

"Multipass Amplifier with full utilization of the active element aperture", by N. F. Andreev, et al., Sov. J. Quantum Electronics, vol. 13, 1983, pp. 641-643.

Applied Physics B. Photophysics and Laser Chemistr, vol. B36, No. 2, Feb. 1985, pp. 83-92.

Soviet Journal of Quantum Electronics, vol. 13, No. 10, Oct. 1983, pp. 1411-1413.

IEEE Journal of Quantum Electronics, vol. QE-17, No. 9, Sep. 1981, pp. 1809-1818.

Soviet Journal of Quantum Electronics, vol. 12, No. 7, Jul. 1982, pp. 970-972.

Soviet Physics Technical Physics, vol. 24, No. 10, Oct. 1979, pp. 1249-1250.

Fig. 1.

EFFICIENT PHASE CONJUGATE LASER

BACKGROUND

This invention relates to lasers and more particularly to laser oscillator/amplifiers using phase conjugate reflectors to compensate for wavefront distortions.

Lasers and laser systems suffer from several sources of wavefront distortion and spectral broadening. Effects caused by thermal stress or gradients, vibration, or aberrations are all problems that contribute to distortions in the radiation wavefronts traversing a laser. In addition, thermal effects cause large transient effects on the operation during start-up, before the thermal equilibrium of steady state operation is reached for the optical elements. This can be a severe problem for pulsed lasers and CW lasers if they are operated in bursts, since the transient period then comprises a larger percentage of the overall laser operating cycle.

Wavefront distortions degrade the performance of a laser and manifest themselves as poor energy extraction efficiency and beam divergence. Depending on the output beam quality and power levels desired, wavefront distortion in the components internal to the laser can make it inadequate for a given application. This is especially true for advanced communications or tracking systems where a nearly diffraction limited laser output is desired. Moreover, even if steady state operation can be made to be satisfactory by conventional means, thermal effects in high power or high energy density lasers still create unsatisfactory performance during the initial start-up periods prior to steady state operation, when the laser elements are acquiring thermal equilibrium.

Several techniques have been proposed for removing or preventing wavefront distortion including specialized retro-reflectors and deformable mirrors. In typical solid state laser rods, thermal gradients generated by the pumping energy causes an effect known as positive lensing which can be corrected with a negative lens. However, for the transient state mechanical drives must be employed to dynamically compensate for the changing lensing. While this has been employed with some success, there are several drawbacks. First, for geometries that are not radially symmetric, such as slab geometry laser gain media, media lensing effects are not those of a simple lens and requires complex lens structures to compensate. Second, any "dynamic" lens system requires precise closed-loop detection and adjustment at very high speeds. This has led to the development of electronically controlled, mechanically driven, deformable or flexible mirrors and feedback loops or servo systems in large laser systems. As is readily apparent, this makes a laser or laser system more complex, costly and alignment error prone than desired. This approach also still has operating response (speed) limitations which simply cannot match the transient effects rate to adequately compensate for a variety of applications. No mechanical system has achieved the desired level of compensation for advanced, nearly diffraction limited lasers.

In addition, many applications require or desire efficient operation even during the initial warm-up or start-up phase of operation. Even the previously proposed elaborate mechanical thermal lensing compensation systems have failed to achieve good performance, in terms of efficiency, under transient warm-up conditions. Diffraction limited performance has been demonstrated only in laboratory lasers under steady state conditions.

An alternate proposal to aberration compensation in lasers is the use of phase conjugating reflectors. Here laser energy from a gain medium is reflected by a phase conjugate reflector, which replaces a conventional laser mirror, and then passed back through the gain medium in a double pass configuration.

The phase conjugate reflector produces reflected radiation whose wavefronts behave as a time reversed version of the incident wavefronts. This allows the radiation to re-traverse the same optical path, including any aberrations, in a reverse sense and thus become a non-distorted wavefront. This is discussed in more detail in "Optical Phase Conjugation" by V. V. Shkunov and B. Y. Zel'dovich in SCIENTIFIC AMERICAN 253 #6, 54 (December 1985). In this approach phase conjugation would be used to passively compensate for short and long term transient response or behavior as well as compensate for steady state optical distortions. However, the proposed phase conjugation schemes or embodiments described in the literature either have not been demonstrated, require relatively large amounts of oscillator power and are consequently relatively inefficient, or do not address limitations on energy extraction imposed by amplified spontaneous emission in the amplifying medium.

The basic premise of the oscillator/amplifier arrangement is as follows. Oscillators with excellent beam quality and transient performance can be made at low power. As oscillators are scaled to higher power, thermal problems in the lasing medium become progressively more severe, making it progressively more difficult to simultaneously obtain good oscillator quality, transient performance, and efficiency. The same problems occur with amplifiers; however with amplifiers these problems can more readily be surmounted by the use of phase conjugation, or other, techniques. Therefore, in an oscillator/amplifier it is desirable to minimize the fraction of the total output, and input, energy in the oscillator.

Laser oscillator/amplifiers using phase conjugation have been described in the Soviet literature in articles such as "Cancellation of Phase Distortions in an Amplifying Medium with a Brillouin Mirror," O. Y. Nosach, et al, ZhETF PIS. RED., Vol. 16, No. 11, pp. 617–621 (Dec. 5, 1972) and "Connection between the Wave Fronts of the Reflected and Exciting Light in Stimulated Mandel'Shtam-Brillouin Scattering," B. Y. Zel'dovich, et al, ZhETF PIS. RED., Vol. 15, No. 3, pp. 160–164 (Feb. 5, 1972). Although pulsed systems operating at a high energies have been described, those operating at a high repetition rate have been low gain and energy.

Additional lasers or laser systems are illustrated in U.S. Pat. Nos. 4,321,550 to Evtohov, and 4,233,571 to Wang et al. These patents cover lasers whose output is obtained after single or multiple passing laser radiation through a gain medium. Energy is extracted out of the gain media on one round trip. While these lasers appear to offer aberration compensation and improved wavefront output, they require relatively large amounts of oscillator energy to drive since the medium is not efficiently driven to saturation. Also, these designs do not allow for a wide range of optical distortions in the lasing medium and, therefore, transient performance is not good and/or performance is limited to a narrow power range.

What is needed, then, is a method to saturate the laser gain media, and thus obtain high extraction efficiency while minimizing oscillator performance requirements. This requires that the amplifier has high gain. However, since the gain is limited by amplified spontaneous emission, methods are also needed to minimize this effect. At the same time, methods are needed to improve the optical layout so that phase conjugation can be made effective over a wide range of optical distortions, allowing operation during transients and over a wide power range.

SUMMARY

One purpose of the invention is to allow the maximum extraction of energy from the gain medium while using phase conjugation.

A second purpose of the invention is to improve the range of output powers and transient response for phase conjugated lasers.

A third purpose is to increase the overall efficiency of the oscillator/amplifier configuration by maximizing the ratio of amplifier to oscillator energy.

A fourth purpose is to increase the amount of power output.

A fifth purpose of the invention is to maximize the fidelity of the phase conjugation by an optical design that minimizes the loss of phase information along the optical path.

These and other purposes of the invention are realized in a laser apparatus utilizing a master oscillator power amplifier (MOPA) configuration wherein a master oscillator provides a source of radiation that is injected into an amplifying stage where it is amplified to provide desired higher power output laser radiation. The master oscillator comprises a low energy, high phase front quality, and high spectral purity laser oscillator which provides pulses of laser radiation. The pulses have a duration and wavelength determined by the desired laser application as well as the type of oscillator medium used.

The amplifier stage comprises at least one lasing medium gain element disposed along an optical path extending between a phase conjugate reflector disposed on one end and an optical coupler on the other.

The energy from the master oscillator is coupled into the gain element using an optical coupler to selectively couple a predetermined percentage of the output from the master oscillator along the optical path through the gain element. The coupling means is also configured to prevent all but a predetermined percentage of radiation exiting the amplifier stage from re-entering the master oscillator.

The laser further utilizes a delay means positioned between the gain element and the phase conjugate reflector means to assure that radiation pulses from the master oscillator traverse and substantially exit the gain element, toward the phase conjugate reflector means, before any reflected radiation from the phase conjugate reflector means enters the gain element again. The delay means is preferably achieved by establishing an optical path between the gain element and the phase conjugate reflector whose length is equal to or greater than a distance, D, which is defined as $D = \frac{1}{2}\tau c n$ where $\tau$ is the temporal duration of pulses being injected by the master oscillator, c is the speed of light, and n is the index of refraction of the medium being traversed.

In a further aspect of the invention, an optical coupler has a polarization dependent transmittance of radiation from the master oscillator into or along the gain element optical path and the laser further includes polarization rotating means for rotating the polarization of radiation reflected by the phase conjugate reflector and traversing along the optical path toward an optical coupler. This is preferably accomplished by using a high quality optical flat positioned at Brewster's angle with respect to the master oscillator input radiation and a polarization rotator, a quarter wave plate, or a frequency doubler adjacent to the Brewster plate. This arrangement provides isolation between the oscillator and the amplifier.

In another aspect of the invention, the laser employs one or more imaging elements disposed along the optical path between the gain element and the phase conjugate reflector so as to provide substantially maximum transfer of phase information from the media to the phase conjugate reflector and back. This increases the fidelity of conjugation, efficiency of the amplification and saturation, and the range of powers over which the device can operate.

In a further aspect of the invention, the master oscillator and amplifier stages are additionally optically isolated from each other by an isolation means which is preferably a plasma shutter. This prevents laser radiation above a predetermined energy density from re-entering the master oscillator from the amplifier stage.

In still further aspects of the invention, additional laser gain elements may be disposed along the optical path between the first gain element and the phase conjugate reflector. The phase conjugate reflector may comprise a Stimulated Brillouin Scattering medium operating at the desired wavelength or a waveguide.

BRIEF DESCRIPTION OF THE DRAWINGS

The novel features of the present invention may be better understood from the accompanying description when taken in conjunction with the accompanying drawings in which like characters refer to like parts and in which.

DESCRIPTION OF THE PREFERRED EMBODIMENTS

The present invention comprises a laser apparatus utilizing a basic master oscillator power amplifier (MOPA) configuration having coupling means between the master oscillator and amplifier stages as well as a delay means positioned between the amplifier stage and a phase conjugate reflector for double pass reflection. This configuration has the advantage of increased extraction efficiency from the laser gain media and high power output.

Figure 1:
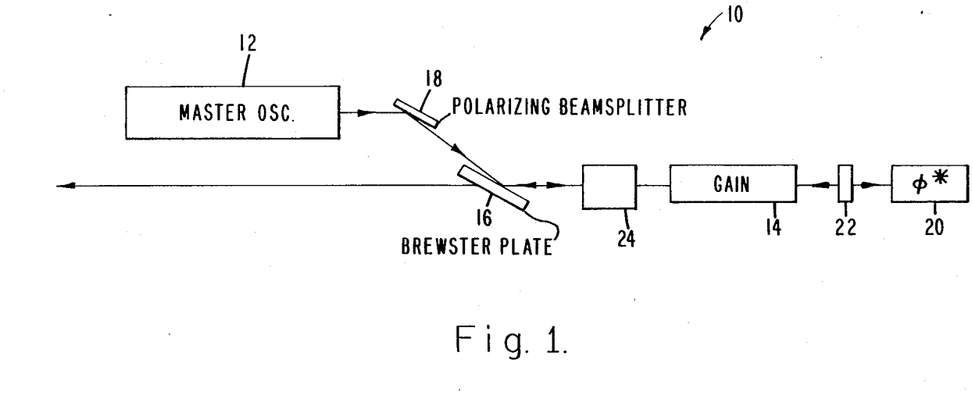
FIG. 1 illustrates a diagrammatic view of a high extraction efficiency laser apparatus according to the principles of the present invention.

The principles of the invention are further illustrated in FIG. 1 where a laser 10 has a master oscillator 12 which provides pulses of radiation to pump a single laser gain element 14. In the embodiment of FIG. 1, the master oscillator is preferably a laser oscillator and is relatively conventional in design. The laser oscillator can comprise one of several known lasers or laser types and use gas, dye or solid state laser media. The laser oscillator in the usual embodiment provides a very high quality output beam, that is, single radial and axial mode performance. However, the output of the oscillator could be designed to have any phase front desired or required of the laser 10. The output of the laser 10 will duplicate this oscillator phase front. The MOPA configuration in conjunction with other elements described below increases energy the extraction from the gain element 14 and therefore allows the oscillator 12 to operate at very low energy on the order of a few millijoules. This differs from previous laser designs and further enhances the ease of constructing an oscillator 12 having a very high quality output. This follows from the fact that at lower energies and powers mode quality, divergence, and spectral broadening are easier to control.

Typically the oscillator 12 is operated at only 1 to 2 percent of the energy level of gain element 14. An added benefit of this design is that oscillator operation can more easily be made to have good performance under transient conditions without significantly effecting overall laser efficiency.

The output of the oscillator 12 is coupled into the gain element 14 using coupling means 16. Coupling means 16 comprises an optical element that is capable of transferring a predetermined percentage of the oscillator output, but not all, to the optical path leading to the gain element 14 without, in conjunction with element 24, allowing return. The preferred embodiment of FIG. 1. utilizes a Brewster plate as coupling means 16. The coupling means 16 can also consist of other elements known in the art including, but not limited to, a polarizer, coated optical flats, or attenuators. Coupling means 16 are also identified herein as Brewster plate 16.

The Brewster plate serves several purposes. It defines a plane beyond which wavefront aberrations are corrected by phase conjunction. All optical components positioned in the optical train after the Brewster plate have their aberrations corrected. More importantly, it also serves to help isolate the oscillator and the amplifier from each other. The Brewster plate will, according to basic principles of optical physics, reflect, depending upon the type of glass used, approximately 15% of the output of the oscillator 12 into the gain element 14. This is accomplished by the automatic separation of incident oscillator 12 output into two polarization modes, p and s polarization. Since it is usually arranged that all of the oscillator output is p polarization, only 15% of oscillator output enters the amplifier stage. Reciprocally, only 15% of any amplified spontaneous emission having the p polarization will enter oscillator 12 from the gain element 14. This approximately 16 dB of induced loss provides isolation that effectively prevents amplified spontaneous emission from occurring as a result of multiple passes through the gain media and/or oscillator. If this is not sufficient, additional loss may be introduced either by using alternate glass in the Brewster plate, attenuators, or other means.

The above paragraph addresses the importance of isolation of the oscillator from the amplifier before the oscillator pulse has been emitted, but while the amplifier elements have high gain. It is also important to isolate or shield the oscillator from being impinged upon by high energy from the amplifier after the oscillator pulse has occurred. The combination of a polarizing Brewster plate and a polarization altering element disposed in the location of elements 22 or 24 does this. If either polarization altering element (both would not be used at the same time) is a quarter wave plate or a 45° Faraday rotator, the combination is well known in the art. In this case, a Brewster plate is particularly effective because of its extremely small ratio of "s" polarization reflection to transmission. If element 24 is a high efficiency frequency doubler operating in what is known to the art as 90 degree phase matching, effective shielding of the oscillator is also achieved.

In the preferred embodiment of FIG. 1, the Brewster plate 16 is an uncoated optical flat, so that its damage threshold is high. Other optical elements, such as but not limited to, beam splitters having multi-layer dielectric coatings could be used for the coupler 16. However, the dielectric coatings have consequently lower damage thresholds. In that case the laser 10 could not be operated in as simple and efficient configuration as described herein because the high fluence levels beneficial to good amplifier energy extraction could not be used without damage. The use of an uncoated Brewster plate makes the gain element the optical element limiting the allowable laser radiation fluence.

The gain element 14 amplifies the radiation injected by the coupler 16 as it traverses the gain element 14 and exists along an optical path to a reflector, identified in the drawing figures as * 20. The reflector 20 is a phase conjugate reflector which can comprise several known phase conjugation materials or elements. However, for the preferred embodiment, and the highest efficiency output, some phase conjugation schemes are not well suited for this application. A four-wave mixing element, as an example, typically requires additional pumping beams or optics which calls for even more power and therefore lower output to input energy ratio as well as increased complexity. Another complication is the fact that four-wave mixers also perform conjugation at essentially any incident radiation energy. Since some low energy stimulated emission is always present, it would be reflected and amplified which is an undesirable result.

Therefore, the preferred phase conjugate reflector 20 comprises a stimulated scattering type medium. Stimulated Brillouin scattering (SBS) reflectors induce a small wavelength shift that can be readily tolerated by the linewidth of the gain element used in the preferred embodiment. Also, stimulated Raman scattering (SRS) reflectors may be employed.

Another very important advantage of a stimulated scattering phase conjugate reflector is the presence of a threshold effect. This threshold effect means that phase conjugation does not start to occur until a minimum intensity is present in the medium comprising the phase conjugate reflector 20. In the preferred embodiment, the phase conjugator is, therefore, deliberately designed to have its threshold higher than any expected amplified spontaneous emission but sufficiently lower than the amplified oscillator pulse that efficient reflection occurs.

The threshold effect means that amplified spontaneous emission radiation from the gain element 14 will not be reflected or phase conjugated as it has a very low intensity. This isolation is provided by a SBS reflector in a passive and simple way. Such isolation would be very difficult to achieve by conventional means. The operation of the laser 10 with an ordinary mirror and without elaborate isolation devices of some type would not be possible because self oscillation of the gain element, which is pumped to very a high gain, would certainly occur. This oscillation cannot occur with the SBS mirror because it can be designed to have essentially zero reflectivity for the low level spontaneous emission of the gain element.

The positioning of the phase conjugate reflector 20 is also critical to the function of the present invention. Previously proposed lasers using a phase conjugate reflector did not recognize the importance of this. Therefore, it was implicitly thought desirable to have the phase conjugate reflector close to the medium for purposes of construction, decreased beam divergence, or other reasons. However, this is not the case. The transit time for radiation reflected from the reflector 20 is an important factor contributing to the efficiency of the laser 10.

The oscillator 12 injects a pulse of radiation along the optical path through the gain element 14 to the reflector 20. This pulse has some finite duration, typically pulses on the order of 10 to 30 nanoseconds which corresponds to a physical length of 10 to 30 feet (based on approximately 1 ft/nanosecond). At the same time the gain element is usually only a few inches in length. Even if the gain element were several feet long, it is clear that the oscillator pulse will travel through the amplifier a part at a time.

This being the case, if the reflector 20 is too close to the gain element 14, the pulse front will start to be reflected from the reflector 20 before the whole pulse has cleared the gain element 14. Therefore, what happens with previous approaches to phase conjugatin and indeed multiple pass amplification in general, is that some of the pulse returns to the gain element before the entire pulse has cleared the first pass. This means that while some of the initially injected pulse is still being amplified some of the returned pulse is already taking energy out of the pumped gain medium.

In terms of detailed laser amplification processes, a pulse traversing an amplifying medium is amplified by creating emission from energetically pumped atoms or molecules present. For a small amount of energy in the pulse the gain is high, say a 100 to 1 ratio for example. The same process occurs for the reflected pulse with a major difference. The returning pulse energy is already high (amplified) so the gain is saturated and the ratio is therefore lower, say 10 to 1.

Gain in general is proportional to the stored energy in an amplifier gain element. The laser 10 is designed in such a way that maximum extraction of the stored energy occurs on the final or second pass of radiation through the gain element 14. Using techniques known in the art of laser design, gain element characteristics and oscillator energy are adjusted so that the first pass gain is high and the gain element medium is saturated by the return pulse resulting in very high energy and efficient extraction from the gain element medium. It is not possible to have high gain in an amplifier element unless it is well isolated.

If the first radiation pass occurs contemporaneously with the second, the later portions of the entering pulses experience very little amplification because a significant fraction of the stored energy, and therefore gain, have already been removed. In this case not all of the of the initial pulse gets amplified, resulting in the reflected pulse not having sufficient energy to ensure saturation on the return pass. To put it another way, while some of the initial pulse is trying to obtain energy, the return pulse at a higher energy is already depleting the medium. The last part of entering pulse from the oscillator 12 would not be adequately amplified due to this depletion. As a result, when reflected from the phase conjugate reflector 20, the last part of the pulse would also not saturate the amplifier medium upon return, resulting in less than optimal output. In the past a proposed solution to this problem was to use a higher energy oscillator in order to provide pulses initially with sufficient energy to effect total extraction on the final pass. This creates other problems. First, a higher energy and power, and therefore more difficult and inefficient to realize, high quality oscillator is required. Second, the Brewster plate 16 and the reflector 20 must be capable of efficiently reflecting higher amounts of energy; losses in either have a greater effect on the laser efficiency. Third, greater distortion of the temporal structure of the pulse occurs.

The laser 10 solves these problems by employing an optical delay between phase conjugate reflector 20 and gain element 14 to assure that all of the initial pulse has traversed the medium before returning. The use of the delay path removes the energy extraction difficulties of configurations without delay. Maximum possible gain is achieved during the first radiation pass because the gain element 14 has high undepleted stored energy on this pass. High extraction is then achieved on the second because the gain is minimally depleted and the oscillator energy was chosen so that the first pass amplified it above the saturation fluence for the amplifier.

The optical delay is implemented in the preferred embodiment of FIG. 1 as an optical path 26 whose length D is chosen to be equal to or greater than the distance, $\frac{1}{2}\tau c$, where c is the speed of light, that light travels during the pulse duration $\tau$ of the oscillator 12. The pulse thus completes the first traversal of the amplifier before it begins the second. This feature allows very efficient operation of the amplifier with small oscillator energy.

The now amplified pulse exiting the gain element 14 again encounters the coupling means 16. If the polarization of the pulses is rotated near 90 degrees from the input polarization, then the pulse passes out of the laser 10. Recalling of course the earlier discussion regarding the transfer of 15% of the energy by reflection from the Brewster plate, only 15% of the energy of non-polarization rotated pulses would return toward the oscillator 12.

To accomplish the desired high percentage output and low percentage reflection back to the oscillator 12, the output from the gain element 14 is linearly polarized perpendicular to the input from the oscillator. This is achieved by using one of several means including using a frequency doubler, quarter wave plate, or a 45° Faraday rotator. The embodiment illustrated in FIG. 1 uses a Faraday rotator or quarter wave plate positioned either between the gain element 14 and the reflector 20 at 22 or between the Brewster plate 16 and the gain element 14 at location 24, or a frequency doubler at location 24. The output can thus pass through the Brewster plate without loss. Note that 22 and 24 may represent different optical elements in different embodiments.

As described a component which changes polarization of the beam is required in the amplifier chain. If a depolarization compensating phase conjugation mirror is employed, a non-reciprocating element such as a Faraday rotator or frequency doubler would be necessary.

Figures 2, 3:
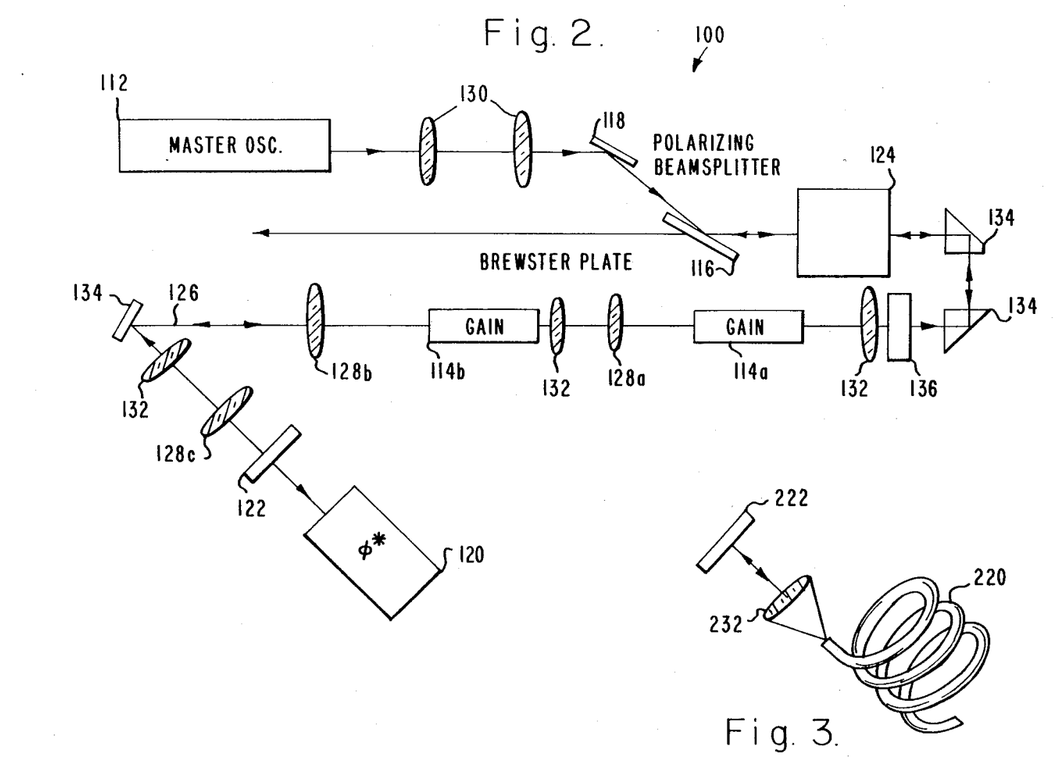
FIG. 2 illustrates a diagrammatic view of a high extraction efficiency laser according to the present invention which utilizes multiple gain elements and the important principle of imaging.
FIG. 3 illustrates an alternative embodiment of the phase conjugating reflector.

While most of the basic principles of the present invention are illustrated in FIG. 1, further elements can be used to improve the output of the laser 10. These additions are shown in FIG. 2 where a laser 100 is illustrated using the basic MOPA configuration. Elements having a number similar to that of FIG. 1 are the same, thus elements 112, 114, 116 and so on are equivalent in function to 12, 14, 16, and so on in FIG. 1.

In FIG. 2 a master oscillator 112 provides pulses for pumping laser gain elements 114a and 114b. Multiple gain elements are used in order to obtain increased energy and/or power output. In the illustrated embodiment two rods spaced apart so as to prevent amplified spontaneous emission (ASE) between them are used. However, any transverse geometry consistent with ASE considerations can be used.

When using multiple gain elements, the aperture size of each element is controlled so that each successive element is smaller than the previous. Because the phase conjugate reflector has a finite reflectivity, efficiency considerations make it desirable to reflect small amounts of energy from it. If multiple amplifiers of graduated size are used, the energy lost to the phase conjugate reflector will be small. In a reduction to practice of the present invention, approximately 20 mJ were lost in this manner: output was 850 mJ. The amount of energy at the mirror was approximately 100 mJ.

The oscillator 112 input portion of the laser 100 has additional elements present for increased protection of the oscillator from stray amplifier output. When a frequency doubler 124 is included in the laser 100 adjacent to gain element 114, 15 percent of the residual undoubled energy is reflected back toward the oscillator by the Brewster plate 116. This could damage the oscillator. This can also occur when something other than the frequency doubler is used if significant depolarization is present which allows a large percentage of the output to have the same polarization as the input. To prevent this damage a positive lens telescope 130, arranged as a plasma shutter is positioned in the optical path of the oscillator output. The telescope 130 comprises lens elements that focus the radiation to a narrow waist or spot. The lenses are chosen so that air sparks will occur for an energy level above that of the oscillator output by a factor that takes into account damage tolerance of the relevant components.

A Brewster angle polarizing beam splitter 118 again serves to purify the polarization of the oscillator 112 output as in FIG. 1. and also serves as a convenient, movement insensitive, fold, in conjunction with the Brewster plate 116.

If additional protection or isolation is desired, a Brewster angle or other passive saturable absorber dye Q-switch can be placed between the master oscillator and the amplifier elements and a multiple etalon used for oscillator output coupling. This also aids in protecting the oscillator from stray amplifier output and in preventing isolation of the oscillator and amplifier from pre-lasing prior to Q-switch opening.

A single aperture, which may be apodized, and which may consist of the rod end, is used to define the amplifier beam near field spot size. It is important that only one beam limiting aperture is encountered by the beam.

The embodiment of FIG. 2 further illustrates another improvement provided in the efficiency of laser operation by the use of the present invention. Disposed at several points along the optical path of the laser 100 are a series of lenses used as imaging elements, 128a, b, c and lenses 132 used for otherwise altering beam propagation. These lenses provide for improved operation of the laser 100 by transferring substantially all of the phase information from the gain elements through or to each other and the phase conjugate reflector 118.

To achieve good phase conjugation fidelity substantially all of the phase information in the beam must be collected by the phase conjugate reflector 120. As a beam traverses a long optical path, diffraction occurs, and the phase information concerned with aberrations having smaller transverse scale than the entire beam, spreads into a diverging angle that becomes larger in inverse proportion to the transverse size of the aberrations. If the energy at these larger angles is removed by apertures elsewhere in the optical path before reaching the phase conjugator, the phase information it carries is lost and fidelity is commensurately poorer. Optical elements other than deliberate apertures can effectively, albeit inadvertently, have this effect. For example, in FIG. 2. if one of the features (lens 128) of this invention were not included, the outer diameter of gain element 114b would remove phase information introduced into the beam by gain element 114a. Element 128a is a lens positioned in such a way, known in the art, that it images the aperture of the element 114a into that of the element 114b. The transverse size of element 128a is chosen by design to be such that sufficient of the diverging phase information is collected to provide the desired fidelity.

This imaging technique has not previously been used for laser oscillator/amplifiers, with or without phase conjugation. One reason for this is that the imaging results in the beam being focused at some point between what are known in the art as the object and image planes. This is a problem in high power lasers because air breakdown or materials damage near the focus occurs unless the focus is in an evacuated chamber. In the present invention, however, this problem is controlled in two ways. First, additional lenses 132 in the image planes are used to position the focuses away from optics. Second, an aberrator 136 which deliberately distorts the phase front of the beam in a controlled way, is placed in or near one of the image planes. This results in the focuses not being sufficiently intense to cause air or gas breakdown. The second technique only works if the reflector 120 is phase conjugating. The imaging technique is applicable to all optical amplifiers.

Because the distance between the gain elements 114a, 114b and the phase conjugating reflector 120 may be large, additional relay imaging lenses, 128b and 128c, are used in the embodiment of FIG. 2. Folding reflectors 134 can comprise prisms or conventional mirror elements suitable for the intensity, energy density, and wavelength of interest. The use of folding elements 134 allows for a long optical delay path 126 to be established in a short laser apparatus.

The phase conjugate reflector 120 is again preferably a Stimulated Brillouin Scattering (SBS) type reflector. An exemplary SBS reflector would be methane or tetrafluoromethane in a pressurized gas cell having an optically clear input window. The present invention is not limited, however, to this media, or to the SBS process. Other nonlinear optical processes and other forms of media such as liquids, solid state crystals, glasses and plasmas can be utilized as would be appreciated by those skilled in the art of phase conjugation.

Other geometries of the phase conjugate reflector can be advantageously utilized; one embodiment is briefly illustrated in FIG. 3. Here element 222 is an aberrator 222 which would be placed in the image plane of a lens 128c in the same manner as the aberrator 122. The lens 232 is positioned so as to produce a demagnified image of aberrator 222 into the entrance face of a light guide 220 which constitutes the nonlinear optical medium producing phase conjugation. The light guide may be a solid optical fiber or a tube filled with similar gaseous or liquid media as those given above. The advantage of this geometry is that substantially all the phase information is collected by the phase conjugate reflector 220, meaning that it maintains nearly perfect phase conjugation. This in turn improves the wavefront in the gain elements and therefore, the transfer of energy and efficiency of laser 100.

EXAMPLE

The phase conjugate reflector for the embodiment being described consisted of a six inch long cell filled with pressurized methane or tetrafluoromethane into which the beam was focused using a 100 mm focal length lens; phase conjugation was achieved by backward SBS. Threshold for the device being described occurred at approximately 10 mJ.

An optical schematic is shown in FIG. 2 of an apparatus in which 850 mJ of essentially diffraction limited output energy, at 10 pulses per second, has been demonstrated with the use of 2 Nd:YAG rods 3 inches long (one ¼ inch and the other 5/16 inch in diameter) as amplifier stages and an oscillator having a 12 mJ output.

What is claimed is:

1. A pulsed laser apparatus utilizing a master oscillator, power amplifier configuration wherein a master oscillator provides a source of laser radiation pulses that are injected into an amplifying stage where said pulses are amplified to provide higher power laser output radiation, said laser apparatus comprising:

a master oscillator radiation source for providing low energy, high quality, output radiation pulses;

an amplifier stage comprising a laser gain medium disposed along an optical path and adapted to receive output radiation pulses from said master oscillator radiation source and amplify said pulses to provide amplified laser radiation pulses;

isolation means disposed along said optical path for selectively coupling a predetermined portion of the energy of said radiation pulses which traverse the optical path between said master oscillator radiation source and said amplifier stage;

phase conjugation means disposed along said optical path on the opposite side of said amplifier stage from said coupling means, for reflecting phase conjugate laser radiation pulses in response to amplified laser radiation pulses incident thereon; and delay means disposed between said amplifier stage and said phase conjugation means for substantially delaying said reflected phase conjugated laser radiation pulses reflected by said phase conjugation means until radiation pulses traversing said laser gain medium have exited said laser gain medium.

2. The laser apparatus of claim 1 wherein said delay means comprises means for providing a predetermined optical path length between said gain element and said phase conjugation means which is equal to or greater than a distance (D) defined by the relationship $D = \frac{1}{2}(\tau)cn$, where $\tau$ is the temporal duration of said radiation pulses provided by said master oscillator radiation source, c is the speed of light and n in the index of refraction of said delay means.

3. The laser apparatus of claim 1 wherein said isolation means comprises an optical flat disposed at Brewster's angle with respect to said optical path.

4. The laser apparatus of claim 3 wherein said isolation means further comprises polarization rotating means for rotating the polarization of said radiation pulses.

5. The laser apparatus of claim 4 wherein said polarization rotation means comprises a polarization rotator, quarter wave plate or frequency doubler disposed adjacent to said optical flat.

6. The laser apparatus of claim 1 further comprising imaging means disposed along said optical path between said phase conjugation means and said gain element for coupling a maximum amount of phase information therebetween.

7. The laser apparatus of claim 6 further comprising aberration means disposed along said optical path between said imaging means and said coupling means for distorting the radiation in a predetermined manner to sufficiently decrease the intensity of the radiation coupled by said imaging means to said phase conjugation means.

8. The laser apparatus of claim 1 wherein said isolation means further comprises focusing means for preventing laser radiation pulses having an energy density greater than a predetermined threshold from re-entering said master oscillator radiation source.

9. The laser apparatus of claim 8 wherein said isolation means comprises a plasma shutter.

10. The laser apparatus of claim 1 wherein said amplifier stage further comprises a second laser gain medium disposed along said optical path between said coupling means and said phase conjugation means.

11. The laser apparatus of claim 10 further comprising imaging means disposed along said optical path between said said gain medium and said second gain medium for providing maximum transfer of phase information therebetween.

12. The laser apparatus of claim 10 wherein said imaging means comprises a lens system disposed along said optical path between said gain elements.

13. The laser apparatus of claim 1 further comprising focusing means, disposed along said optical path between said amplifier stage and said phase conjugation means, for focusing said laser radiation pulses into said phase conjugation means.

14. The laser apparatus of claim 1 wherein said phase conjugation means comprises Stimulated Brillouin Scattering means operating at a predetermined wavelength.

15. The laser apparatus of claim 14 wherein said Stimulated Brillouin Scattering means comprises a waveguide.

16. The laser apparatus of claim 14 wherein said Stimulated Brillouin Scattering means comprises an enclosure containing a pressurized gaseous medium comprising methane or tetrafluoromethane.

17. The laser apparatus of claim 1 wherein said phase conjugation means comprises Stimulated Raman Scattering means operating at a predetermined wavelength.

18. A pulsed laser apparatus utilizing a master oscillator, power amplifier configuration wherein a master oscillator provides a source of laser radiation pulses that are injected into an amplifying stage where said pulses are amplified to provide higher power laser output radiation, said laser apparatus comprising:

a master oscillator radiation source for providing low energy, high quality, output radiation pulses;

an amplifier stage comprising a laser gain medium disposed along an optical path and adapted to receive output radiation pulses from said master oscillator radiation source and amplify said pulses to provide amplified laser radiation pulses;

isolation means disposed along said optical path between said master oscillator radiation source and said amplifier stage for selectively coupling a predetermined portion of the energy of said radiation pulses therebetween;

phase conjugation means disposed along said optical path on the opposite side of said amplifier stage from said coupling means, for reflecting phase conjugate laser radiation pulses in response to amplified laser radiation pulses incident thereon; and delay means disposed between said amplifier stage and said phase conjugation means for substantially delaying said reflected phase conjugated laser radiation pulses reflected by said phase conjugation means until radiation pulses traversing said laser gain medium have exited said laser gain medium.

19. The laser apparatus of claim 18 wherein said isolation means comprises:

a Brewster plate disposed along said optical path between said master oscillator radiation source and said gain medium; and polarization rotation means disposed between said Brewster plate and said gain medium for rotating the polarization of said radiation pulses by substantially ninety degrees.

20. The laser apparatus of claim 18 wherein said isolation means comprises:

a Brewster plate disposed along said optical path between said master oscillator radiation source and said gain medium; and a quarter wave plate disposed between said Brewster plate and said gain medium.

21. The laser apparatus of claim 18 wherein said isolation means comprises:

a Brewster plate disposed along said optical path between said master oscillator radiation source and said gain medium; and means for doubling the frequency of said radiation pulses disposed between said Brewster plate and said gain medium.

22. A pulsed laser apparatus employing a master oscillator, power amplifier configuration wherein a master oscillator provides a source of laser radiation pulses that are injected into an amplifying stage where said pulses are amplified to provide higher power laser output radiation, said laser apparatus comprising:

a master oscillator radiation source for providing low energy, high quality, output radiation pulses;

an amplifier stage comprising a laser gain medium disposed along an optical path and adapted to receive output radiation pulses from said master oscillator radiation source and amplify said pulses to provide amplified laser radiation pulses;

isolation means disposed along said optical path between said master oscillator radiation source and said amplifier stage for selectively coupling a predetermined portion of the energy of said radiation pulses which traverse the optical path between said master oscillator radiation source and said amplifier stage; and phase conjugation means disposed along said optical path distal from said master oscillator radiation source, for reflecting phase conjugate laser radiation pulses in response to amplified laser radiation pulses incident thereon said phase conjugation means being disposed at a predetermined distance from said gain medium such that reflected phase conjugate radiation pulses and amplified output pulses are not substantially present within said gain medium at the same time.

23. A pulsed laser apparatus utilizing a master oscillator, power amplifier configuration wherein a master oscillator provides a source of laser radiation pulses that are injected into an amplifying stage where said pulses are amplified to provide higher power laser output radiation, said laser apparatus comprising:

a master oscillator radiation source for providing low energy, high quality, output radiation pulses;

an amplifier stage comprising a laser gain medium disposed along an optical path and adapted to receive output radiation pulses from said master oscillator radiation source and amplify said pulses to provide amplified laser radiation pulses;

a Brewster plate disposed along said optical path between said master oscillator radiation source and said gain medium and polarization rotator disposed between said Brewster plate and said gain medium for isolating the master oscillator radiation source from the amplifier stage, said Brewster plate and polarization rotator being adapted to couple a predetermined portion of the energy of the radiation pulses which traverse the optical path between the master oscillator radiation source and the amplifier stage; and phase conjugation means disposed along said optical path distal from said master oscillator radiation source, for reflecting phase conjugate laser radiation pulses in response to amplified laser radiation pulses incident thereon said phase conjugation means being disposed at a predetermined distance from said gain medium such that reflected phase conjugate radiation pulses and amplified output pulses are not substantially present within said gain medium at the same time.

* * * * *